April 27, 1965  C. W. B. GRIGSON  3,180,986
MEASURING SYSTEMS FOR ELECTRON DIFFRACTION PATTERNS
Filed Aug. 13, 1962
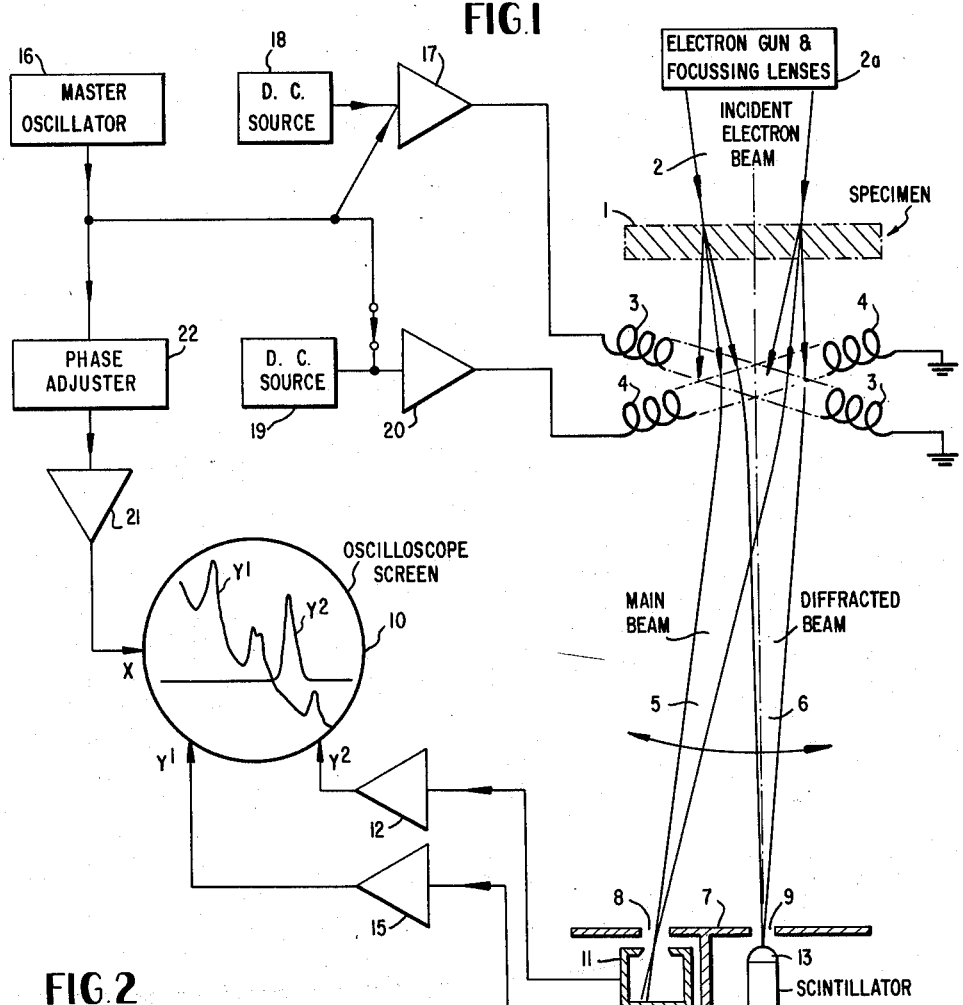
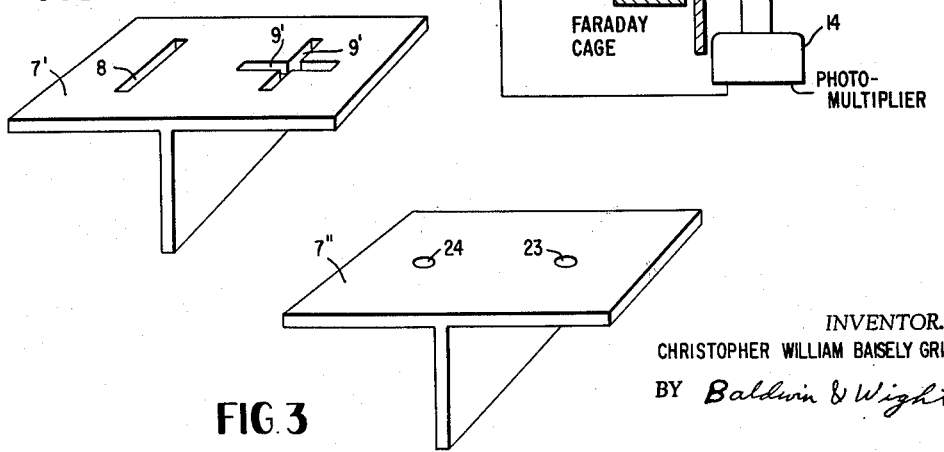
INVENTOR.
CHRISTOPHER WILLIAM BAISELY GRIGSON
BY Baldwin & Wight
ATTORNEYS

United States Patent Office 3,180,986
Patented Apr. 27, 1965

3,180,986
MEASURING SYSTEMS FOR ELECTRON
DIFFRACTION PATTERNS
Christopher William Baisely Grigson, % Engineering
Laboratory, University of Cambridge, Trumpington St.,
Cambridge, England
Filed Aug. 13, 1962, Ser. No. 216,402
Claims priority, application Great Britain, Aug. 17, 1961,
29,790/61
6 Claims. (Cl. 250—49.5)

This invention relates to measuring systems for electron diffraction patterns.

According to the present invention there is provided a high speed measuring system for electron diffraction patterns which consists in scanning the diffracted beam or beams to be measured across a slit or fine hole at a rate faster than one scan every ten seconds and measuring the beam or beams of electrons passing through the slit or fine hole.

The system of the present invention may be used for the continuous observation of changes in a sample being studied, for example solid state changes in metals and alkali halides which may take as little as 100 seconds to complete. It is therefore to be contrasted with the system described by G. O. Bagdyk'yants and A. G. Alekseev, Bull Academy of Sciences U.S.S.R., Physical Series, 23,766 (1958), where recording times are given as 5 minutes. In fact, with the present invention, the rate of scan may be from 0.1 to 500 c./s.; mains frequency may suitably be employed. The scanning of the diffracted electron beam is preferably done by means of magnetic fields. These fields are preferably generated from alternating electrical waveforms which may be sinusoidal, saw-tooth or triangular in shape.

According to a further feature of the invention there is provided apparatus for obtaining electron diffraction patterns from a specimen through or across which a beam of electrons passes, which includes means for scanning the diffracted beams across a slit or fine hole at a rate faster than one scan every ten seconds, electron collecting means, and associated means for recording or displaying the diffracted patterns so collected.

The scanning means preferably includes a pair of coils which, when energised, produce a magnetic field, suitably one coil having a D.C. component on which an A.C. scanning component is superimposed.

In a preferred form of the invention there are two slits or fine holes, one of which is used for the diffracted beam or beams to be measured while the other is used for the main (undiffracted) beam. Where there are two slits, two separate electron collecting means are used. One of these two means may be a scintillator-photo-multiplier combination. The two electron collecting means and associated means may have different sensitivities which render the outputs substantially equivalent so as to avoid saturation of the main beam channel due to its much greater input signal.

Where there is a displaying means, it may be an oscilloscope on which both the main and diffracted beams can be simultaneously displayed.

In a modification two slits at right-angles to each other or a single fine hole are provided for the diffracted beam or beams to permit measuring of the profiles of diffracted spots in two dimensions in diffraction from single crystals. If desired two further slits at right angles to each other, or a further fine hole are provided for the main undiffracted beam to show its profile in the two directions. A multi channel oscilloscope may be provided to show all traces.

The present invention will now be described in greater detail by way of example with reference to the accompanying drawing in which FIGURE 1 is a schematic diagram of a system for obtaining electron diffraction patterns, while FIGURES 2 and 3 show in perspective two modified forms of the slitted plate.

Referring to FIGURE 1 the specimen whose diffraction pattern is to be studied is located at 1. The incident beam of electrons 2 is emitted from a suitable electron gun and passes through suitable focussing lenses, the conventional electron gun and lenses being illustrated by block 2a. On the side of the specimen remote from the electron gun, two pairs of coils 3 and 4 are situated at right angles to one another around an annular magnetic yoke. The pairs of coils 3 and 4 produce magnetic fields which act on the beam of electrons at right angles to one another. The pair of coils 3 act as the scanning coils, the manner of operation of which will be described later.

If the specimen is in powder form, the beam of electrons from the specimen includes a main beam 5 and a series of diffracted beams in the form of concentric rings. The main beam 5 and the diffracted beams to be measured are brought to a focus on to a slitted plate 7, one such diffracted beam being indicated at 6. The plate 7 is provided with two slits 8 and 9 having a width of approximately 60 $\mu$. Each slit has a recording system associated with it, the outputs from the respective slits 8 and 9 being applied to the $Y_1$ and $Y_2$ deflection plates of an oscilloscope 10 after suitable amplification. As shown in FIGURE 1, a Faraday cage 11 collects the main beam electrons passing through the slit 8. The output from the Faraday cage 11 is amplified by a suitable amplifier 12 before being applied to the $Y_2$ plates of the oscilloscope 10. A scintillator 13 collects the diffracted beam electrons passing through the slit 9 and converts the energy represented by these electrons into light, which is then reconverted into an electrical current by means of a photo-multiplier 14. The output from the photo-multiplier is amplified in an amplifier 15 before being applied to the $Y_1$ plates of the oscilloscope 10.

A master oscillator 16 supplies the scanning waveforms both to a current amplifier 17 which drives the coils 3 and to the X amplifier 21 of the display oscilloscope via a phase adjuster 22, thus giving perfect synchronization. The output from oscillator 16 is fed to the current amplifier 17, which can amplify both alternating and direct currents. A direct current can be applied to the input of the amplifier 17 by means of a suitable source of direct current illustrated by the block 18 in the drawing. The combination of the D.C. and A.C. waveforms in the amplifier 17 is fed to the coils 3 and produces the scanning field. A similar D.C. source 19 and amplifier 20 feeds the coils 4.

The oscillator 16 is adapted to generate a sinusoidal, saw-tooth or triangular waveform having a frequency of from 0.005 to 500 c./s. This alternating or periodic voltage together with the D.C. voltage permits any part of the diffracted beam to be studied and scanned, since the D.C. component of the scanning field can bring any part of the diffraction pattern into the region of the slits, and the alternating component of the same field can then scan the chosen part of the diffraction pattern about the slit. For the purpose to which the system is put the rate of scanning should be faster than one scan every ten seconds. The sensitivities of the recording systems differ by four orders of magnitude, the diffracted rays passing through the slot 9 requiring approximately four orders as much amplification as the rays of the main beam passing through the slit 8. Thus it is possible to display on the screen of the oscilloscope the main beams as well as the diffracted pattern; and, by means of suitable calibration, it is possible to determine accurately the relative strength of the diffracted pattern and the distance of the concentric rings from the main beam. Calibration of the intensities may be effected by displaying simultaneously to more intense diffracted beams through both channels. Thus the sensitivity of the photo-multiplier channel may be directly compared with the sensitivity of the other channel when amplifiers of known gain are used.

Magnetic fields have been chosen to cause the deflection of the electron beams because they do not cause a defocussing of the beams and because the accelerating voltage can be altered without altering the relative positions of peaks in the diffraction profile. The use of triangular sweep waveforms enables a direct check to be made of sweep linearity since with an inductive load only a linear waveworm will give accurate registering of the pattern for both directions of travel.

A deflection and display system not shown in the drawings but similar to coils 3 and the system 8, 11, 12 may be additionally used to display the profile of the incident beam. Deflection of the incident beam into such a system should occupy only a small fraction of the time of each diffraction-scan cycle.

Where a single crystal is used instead of a powder, the diffraction pattern will be different and will consist of discrete spots of diffracted beams. These may be treated in exactly the same way as the concentric rings in the apparatus described above. However, it is then necessary to employ the slitted plate 7' of FIGURE 2 in the place of plate 7 in FIGURE 1. The modified plate 7' is provided with two slits 9' at right-angles to each other. By applying an alternating component also to the coils 4, the diffracted beams may be scanned across each slit 9' in turn to measure the profiles of the spots of diffracted beams in two dimensions.

As indicated in the drawings, the trace from the diffracted beams (three diffracted beams being shown) are superimposed on a base which varies as a high inverse power of the ring radius; if it is desired to have the trace on a substantially flat base, this may be done by applying an appropriate signal related to sweep position to a suitable number of dynodes in the photomultiplier.

In a system slightly modified from that shown in the drawings, reflection electron diffraction may be used instead of transmission electron diffraction as described above. In such a system the electron beam is passed at grazing incidence over the surface of a solid specimen.

While the above examples have described the use of a slit or slits, it will be appreciated that a fine hole or holes may be used instead of the slit or slits. FIGURE 3 illustrates this alternative, wherein a similar plate 7" used for the measurement of the diffraction pattern of a single crystal has a fine hole 23 instead of the two slits 9' and another fine hole 24 instead of the main beam receiving slit 8.

What I claim and desire to secure by Letters Patent is:

1. Apparatus for obtaining and measuring electron diffraction patterns from a specimen comprising an electron gun for emitting an incident beam of electrons which pass through the speciment and thus form a main undiffracted beam of electrons and at least one diffracted beam of electrons, electron deflecting means for deflecting the beams of electrons after they have passed through the specimen, an oscillator supplying a scanning waveform to the electron deflecting means at a rate of between 0.1 cycle per second and 500 cycles per second, a plate on which the electrons impinge, said plate being located downstream from the electron deflecting means and having two slits therein, the main beam passing through one slit and the diffracted beam passing through the other slit, electron collecting and amplifying means associated with each slit, the sensitivity of the collecting and amplifying means associated with the diffracted beam being approximately four orders of magnitude ($10^4$) greater than the sensitivity of the collecting and amplifying means associated with the main beam, and cathode ray tube means for displaying simultaneously the main and diffracted beams in synchronism with the scanning.

2. Apparatus for obtaining and measuring electron diffraction patterns from a specimen comprising an electron gun for emitting an incident beam of electrons which pass through the specimen and thus form a main undiffracted beam of electrons and at least one diffracted beam of electrons, two sets of coils positioned at right angles to each other to deflect the beams of electrons after they have passed through the specimen, an oscillator supplying a scanning waveform to at least one of said sets of coils at a rate of between 0.1 cycle per second and 500 cycles per second, a separate adjustable source of D.C. potentional for each set of coils, a plate located downstream from the two sets of coils, said plate having two small holes therein, the main beam passing through one small hole and the diffracted beam passing through the other small hole, electron collecting and amplifying means associated with each small hole, the sensitivity of the collecting and amplifying means associated with the diffracted beam being approximately four orders of magnitude ($10^4$) greater than the sensitivity of the collecting and amplifying means associated with the main beam, and cathode ray tube means for displaying simultaneously the main and diffracted beams in synchronism with the scanning.

3. Apparatus for obtaining and measuring electron diffraction patterns from a specimen comprising an electron gun for emitting an incident beam of electrons which pass through the specimen and thus form a main undiffracted beam of electrons and at least one diffracted beam of electrons, two sets of coils positioned at right angles to each other to deflect the beams of electrons after they have passed through the specimen, an oscillator supplying a scanning waveform to at least one of said sets of coils at a rate of between 0.1 cycle per second and 500 cycles per second, a separate, manually adjustable source of D.C. potential connected to each set of coils, a plate located downstream of the beams from the two sets of coils, said plate having two small holes therein, the main beam passing through one small hole and the diffracted beam passing through the other small hole, a Faraday cage positioned immediately behind the plate to receive electrons of the main beam that have passed through one of the small holes, a first amplifier conected to the output of the Faraday cage, a cathode ray oscilloscope having X deflection plates and two sets of Y deflection plates, means for applying the output from the first amplifier to one of said sets of Y deflection plates, a scintillator and a photomultiplier positioned to collect electrons of the diffracted beam that have passed through the other small hole of the plate, a second amplifier connected to the output of said photomultiplier, means for applying the output from the second amplifier to the other of said sets of Y deflection plates, and means for applying the output from said oscillator to said X deflection plates in synchronism with the scanning waveform applied to at least one of said sets of coils, so that both the main and diffracted beams are simultaneously displayed on the screen of the cathode ray oscilloscope.

4. Apparatus for obtaining and measuring electron diffraction patterns according to claim 3, where the total amplification of the diffracted beam is approximately four orders of magnitude ($10^4$) greater than the total amplification of the main beam.

5. Apparatus for obtaining and measuring electron diffraction patterns from a specimen comprising an electron gun for emitting an incident beam of electrons which pass through the specimen and thus form a main undiffracted beam of electrons and at least one diffracted beam of electrons, two sets of coils positioned at right angles to each other to deflect the beams of electrons after they have passed through the specimen, an oscillator supplying a scanning waveform to each set of coils alternately at a rate of between 0.1 cycle per second and 500 cycles per second, a separate, manually adjustable source of D.C. potential connected to each set of coils, a plate located downstream of the beams from the two sets of coils, said plate having three slits therein, the main beam passing through one of the slits, the other two slits being arranged as a pair at right angles to one another for passing the diffracted beam, and electron collecting and amplifying means associated with said three slits comprising, in combination, a Faraday cage positioned immediately behind the plate to receive electrons of the main beam that have passed through said one slit, a first amplifier connected to the output of the Faraday cage, a cathode ray oscilloscope having X deflection plates and two sets of Y deflection plates, means for applying the output from the first amplifier to one of said sets of Y deflection plates, a scintillator and a photomultiplier positioned to collect electrons of the diffracted beam that have passed through said other two slits, a second amplifier connected to the output of said photomultiplier, means for applying the output from the second amplifier to the other of said sets of Y deflection plates, and means for applying the output from said oscillator to said X deflection plates in synchronism with the scanning waveform applied alternately to each set of coils whereby the main and diffracted beams are simultaneously displayed on the screen of the cathode ray oscilloscope and the diffracted beam is scanned across each of said other two slits in turn to measure the profiles of the spots of the diffracted beam in two dimensions.

6. Apparatus for obtaining and measuring electron diffraction patterns from a specimen, said apparatus comprising means for emitting an incident beam of electrons, means for passing said incident beam through the specimen to form a main undiffracted beam of electrons and at least one diffracted beam of electrons, electron deflecting means for deflecting said main beam and said diffracted beam, means for applying a scanning waveform to said electron deflecting means at a rate of between 0.1 cycle per second and 500 cycles per second to control the deflection of the deflected beams, a plate upon which the electrons of the deflected beams impinge, said plate having at least two apertures therein so positioned that the main beam passes through one aperture and at least one diffracted beam passes through another aperture during the scanning, separate electron collecting and amplifying means associated with each aperture, the sensitivity of the collecting and amplifying means associated with diffracted beams being substantially greater than the sensitivity of the other collecting and amplifying means associated with the main beam, and means for simultaneously displaying the main and diffracted beams in synchronism with the scanning.

References Cited by the Examiner
UNITED STATES PATENTS

| | | | |
|---|---|---|---|
| 2,435,386 | 2/48 | Davidson | 250—49.5 |
| 2,506,080 | 5/50 | Gross | 250—49.5 |
| 2,561,988 | 7/51 | Longini | 250—49.5 |
| 2,727,153 | 12/55 | Coltman | 250—49.5 |

RALPH G. NILSON, *Primary Examiner.*